(12) United States Patent
Keller et al.

(10) Patent No.: US 7,520,972 B2
(45) Date of Patent: Apr. 21, 2009

(54) PROCESS FOR MAKING A MOLD PIECE HAVING A MAIN CURVED SURFACE BEARING A UTILITY MICROSTRUCTURE

(75) Inventors: Gerhard Keller, Saint-Maur-des-Fosses (FR); Mary Jane New, Royston (GB); Kerim Yasan Arda, Cambridge (GB); Philip John Rawlins, Chesterton (GB); Allan Carmichael, Orwell (GB)

(73) Assignee: Essilor International, Charenton le Pont (FR)

( * ) Notice: Subject to any disclaimer, the term of this patent is extended or adjusted under 35 U.S.C. 154(b) by 770 days.

(21) Appl. No.: 10/519,962

(22) PCT Filed: Jun. 30, 2003

(86) PCT No.: PCT/EP03/06995

§ 371 (c)(1),
(2), (4) Date: Sep. 6, 2005

(87) PCT Pub. No.: WO2004/002706

PCT Pub. Date: Jan. 8, 2004

(65) Prior Publication Data

US 2006/0096865 A1    May 11, 2006

(30) Foreign Application Priority Data

Jul. 1, 2002    (GB) .................................. 0215164.5

(51) Int. Cl.
*C25D 1/10*    (2006.01)
(52) U.S. Cl. ............................ 205/70; 205/67; 264/219; 264/224; 264/226

(58) Field of Classification Search ............... 205/67, 205/70; 264/219, 220, 224, 226
See application file for complete search history.

(56) References Cited

U.S. PATENT DOCUMENTS 4,937,030 A    6/1990    Nishiyama et al. .......... 264/162

FOREIGN PATENT DOCUMENTS

| EP | 0 400 672 | 12/1990 |
|---|---|---|
| EP | 0 757 262 | 2/1997 |
| WO | WO 99/29494 | 6/1999 |

OTHER PUBLICATIONS

Campbell et al., "Replication and compression of bulk and surface structures with polydimethylsiloxane elastomer," *J. Chem. Edu.*, 75:537-541, 1999.

*Primary Examiner*—Nam X Nguyen
*Assistant Examiner*—Luan V Van
(74) *Attorney, Agent, or Firm*—Fulbright & Jaworski L.L.P.

(57) ABSTRACT

A process for making a mould piece having a main curved surface bearing an utility microstructure which comprises transferring a utility microstructure from a master piece main surface to a main surface of a flat cured elastomeric film; pressing the cured elastomeric film and a master article against each other so as to conform the overall shape of said cured elastomeric film to the curved shape of the main surface of the master article and to spread over a curable coating composition between the curved main surface of the master article and the main surface bearing the replica of the said utility microstructure of the cured elastomeric film; curing the coating composition; removing the cured elastomeric film and depositing a layer of a metal or a metallic alloy on the exposed main surface of the hard coating of the master article; and recovering said metal or metallic alloy layer to obtain a mould piece having a curved main surface bearing a replica of said transferred utility microstructure.

16 Claims, 3 Drawing Sheets

PROCESS FOR MAKING A MOLD PIECE HAVING A MAIN CURVED SURFACE BEARING A UTILITY MICROSTRUCTURE

This application is a national phase application under 35 U.S.C. § 371 of International Application No. PCT/EP2003/006995 filed 30 Jun. 2003, which claims priority to Great Britain Application No. 0215164.5 filed 1 Jul. 2002, the contents of which applications are incorporated herein by reference in their entirety.

The present invention relates to the field of microstructure replication and more precisely to a process for making a piece having a main curved surface bearing an utility microstructure. In particular, the present invention concerns a process for making such a piece usable for mass production of moulded articles, in particular ophthalmic lenses, having a main surface bearing an utility microstructure and preferably a microstructure having anti-reflection properties.

It is known to impart utility microstructures such as holograms, diffraction gratings and microstructures having antireflection properties in different kinds of articles.

One particular technique for manufacturing these articles consists in moulding the articles in moulds in which at least one surface of the moulding cavity bears a microstructure.

Many different methods for obtaining mould pieces and especially lens mould pieces having a main surface of the moulding cavity bearing an utility microstructure are described in international patent application WO 99/29494.

In document WO 99/29494, the utility microstructure is initially obtained by an interferential method. Such a method is well known for the replication of microstructure in an article having flat surfaces. However, if this method is used for creating microstructure directly in a non planar surface, some distortions of the pattern of interference fringes creating the microstructure may occur. It is then necessary to create a pattern of interference fringes that is itself modified to take into account the curvature of the surface on which the microstructure must be imprinted.

When the article on which the microstructure is to be transferred is an ophthalmic lens or a lens mould, whose article surfaces are designed according to each spectacle lens wearer, it is a complicated and cumbersome procedure adapting the pattern of interference fringes to the curvature of each lens.

One solution provided in document WO 99/29494 is to imprint the microstructure in a first surface of a flexible flat support, applying the opposite surface of this support onto the main surface of a mould piece by modifying the shape of the flexible flat support, so as to conform its geometry to the geometry of the mould piece main surface in order to obtain a composite mould having a curved moulding main surface bearing the microstructure.

One problem with that solution is that it is difficult to find support materials that can be at the same time:

- sufficiently soft and flexible to withstand shape deformation without inducing cracking at the support surface;
- sufficiently stable to keep the dimensional integrity of the microstructure during the subsequent lens moulding process, in particular when high temperatures are required as for example during the curing step of the lens composition;
- sufficiently compatible with different monomer compositions, i.e. being chemically inert and providing sufficient wettability with the monomer compositions to adequately fill the microstructures, and
- sufficiently durable to withstand the moulding of a high number of articles such as ophthalmic lenses (mass production).

European patent EP 400.672 describes a technique for forming an unitary mould having a microstructure integrally formed on its inside surface. More particularly, a film having one surface bearing a hologram, a diffraction grating or other microstructure is firmly attached through its surface opposite to the surface bearing the microstructure onto the surface of a model of the article to be moulded. Then, a mould piece conforming to the outside shape of at least a portion of the model is formed by electrodeposition of metal onto the surface of the film attached to the model.

The deposited metal is then separated from the model and mechanically reinforced for use as a mould piece, for example in standard injection moulding.

This technique necessitates that the flexible film bearing the microstructure be firmly attached to the surface of a model of articles to be moulded. Such an attachment step increases the risk of a deterioration of the film bearing the microstructure such as for example a cracking of the film, in particular when the surface model is a curved surface.

The publication "Soft lithography" Younan Xia, George M. Whitesides; Angew. Chem, Int. Ed. 1998, 37, 550-575, describes on page 764 a method of replica moulding against a deformed polydimethylsiloxane mould. According to this method, a microstructure is first imprinted in a polydimethylsiloxane mould. The relief features on the polydimethylsiloxane mould are reconfigured by mechanical deformation and the deformed structure is replicated by casting a UV curable liquid polyurethane or a thermally curable epoxy against the polydimethylsiloxane mould.

More particularly, in one embodiment, a thin polydimethylsiloxane (PDMS) mould (about 50 micrometers thick) having a surface bearing a microstructure is bent so that the microstructure bearing surface of the PDMS mould is brought into conformal contact with curved surface (lens) coated with a thin film of liquid polyurethane.

After curing of the polyurethane, the PDMS mould is removed to reveal the polyurethane replica on the surface of the cylindrical substrate. Finally, one thus obtains a final lens coated with a polyurethane coating having a microstructure imprinted in it.

Such a method is not usable in practice for mass production.

Thus, the object of the present invention is to provide a simple, reproducible and quick process for making a curved mould piece bearing a utility microstructure, said curved mould piece being usable in practice for mass production of articles such as lenses bearing on a main surface thereof an utility microstructure.

According to the invention, there is provided a process for making a mould piece having a main curved surface bearing an utility microstructure which comprises:

a) providing a master piece having a flat main surface bearing a utility microstructure;

b) transferring said utility microstructure from the master piece main surface to a main surface of a flat cured elastomeric film;

c) recovering the flat cured elastomeric film having a main surface bearing a replica of said utility microstructure;

d) providing a master article having a main curved surface;

e) applying a curable coating composition:
  on the main curved surface of the master article, or
  on the main surface bearing the replica of said utility microstructure of the flat cured elastomeric film, or
  on both surfaces.

f) placing the main surface bearing the replica of said utility microstructure of the flat cured elastomeric film and the main coated surface of the master article in front of each other;

g) pressing said cured elastomeric film and said master article against each other so as to conform the overall shape of said cured elastomeric film to the curved shape of the main surface of the master article and to spread over the curable coating composition between the curved main surface of the master article and the main surface bearing the replica of said utility microstructure of the cured elastomeric film;

h) curing the coating composition;

i) removing the cured elastomeric film and recovering a hard coated article having a main curved surface coated with a hard coating having an exposed main surface bearing a transferred utility microstructure;

j) depositing a layer of a metal or a metallic alloy on said exposed main surface of the hard coating of the article, and k) recovering said metal or metallic alloy layer to obtain a mould piece having a curved main surface bearing a replica of said transferred utility microstructure.

The invention will now be described in connection with the drawings in which.

Figure 1A:
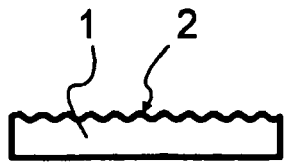
FIGS. 1A to 1J illustrate the main steps of the process according to the invention.

As shown in FIG. 1A, there is first provided a flat master mould 1 having a main flat surface bearing a utility microstructure 2.

The flat master can be made of any suitable material but it is preferably made of metal or a metallic alloy and in particular of nickel.

The utility microstructure 2 may be any utility microstructure such as a hologram, a diffraction grating, or a microstructure having antireflection properties. Preferably, the utility microstructure is a microstructure having antireflection properties.

The utility microstructure 2 which is borne by the main flat surface of the master piece 1 can be previously obtained by any available technique including the one described in European patent application EP 757.262 which concerns a process for obtaining a microgranular surface comprised of $SiO_2$.

A preferred method for obtaining the utility microstructure 2 is the interferential method described in international patent application WO 99/29494.

More precisely, the interferential process consists in making a pattern of interference fringes by superimposing two coherent light waves, for example two laser beams, and irradiating a photosensitive material layer coated onto a substrate through such pattern of interference fringes.

Then, by developing conventionally the photosensitive material layer, a periodic microstructure is obtained.

Two irradiation steps for the photosensitive layer can be provided if desired by rotating the substrate, preferably by 90° after the first irradiation step, and then the photosensitive material layer is developed conventionally.

A periodic microstructure is then obtained in the plane. Thus, an isotropic structure may be obtained the antiglare properties of which are independent from the sight angle.

Naturally, patterns of interference fringes having different or identical pitches (i) and amplitudes (2A) can be formed. Also, said irradiation steps may be repeated various times so as to obtain after development a final microstructure formed with multiple superimposed microstructures.

Generally, the wavelength of the coherent light beams, for example laser beams, is comprised between 170 and 510 nm and the pitch of the pattern of interference fringes (and consequently of the periodic microstructure being obtained) is comprised between 100 and 300 nm. The amplitude 2A is comprised generally between 100 and 300 nm.

Preferably plane light waves are used and so a sinusoidal microstructure is obtained.

The periodic microstructure may be generally defined in an orthogonal reference system (x, y, z) with the following equation (1):

$$z = f(x, y) = \sum_{n=1}^{k} \left[ A_n \sin\left(2\Pi n \frac{x}{i}\right) + B_n \cos\left(2\Pi n \frac{x}{i}\right) \right] + \sum_{m=1}^{k} \left[ C_m \sin\left(2\Pi m \frac{y}{i}\right) + D_m \cos\left(2\Pi m \frac{y}{i}\right) \right] \quad (1)$$

where $A_n$, $B_n$ are Fourier coefficients in the microstructure in the direction x, $C_m$, $D_m$ are Fourier coefficients in the microstructure in the direction y, and i is the pitch (period) of the microstructure.

Preferably, $B_n = D_m = 0$, $A_n = C_m = A$ (sinusoidal structure) and the pattern of interference fringes and, consequently, the microstructure may be represented by the equation (2):

$$z = f(x, y) = A\left[\sin\left(2\Pi \frac{x}{i}\right) + \sin\left(2\Pi \frac{y}{i}\right)\right] \quad (2)$$

where i is the period and A the half-amplitude.

Preferably, the utility microstructure is a periodically repetitive structure having a period of 250 nm.

Figure 1B:
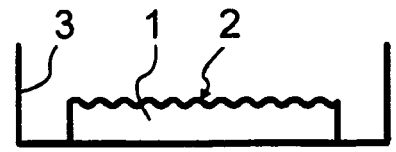

The flat master piece 1 is then placed in a container 3, for example a metallic container, with the microstructure 2 facing outwardly towards the open end of the container 3 (FIG. 1B).

Figure 1C:
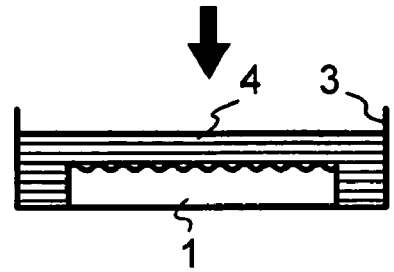

As shown in FIG. 1C, an appropriate amount of an elastomeric film forming curable composition 4 is then poured over the master piece 1. Although, UV and/or thermally curable compositions can be used, it is preferred to use thermally curable compositions and in particular thermally curable polydimethylsiloxane (PDMS) compositions.

Figure 1D:
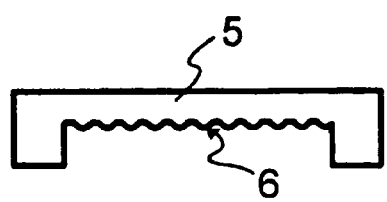

After curing the curable composition 4, a flat cured elastomeric film 5 having a main surface 6 bearing a replica of the utility microstructure 2 is recovered as shown in FIG. 1D.

As previously indicated, the preferred flat cured elastomeric films are preferably made of cured PDMS, such as those obtained by curing a curable PDMS composition Sylgard Elastomer 184.

Another suitable material for the elastomeric film is RTV 615™ commercialised by G.E. silicones absorbing UV light under 214 nm.

Typically, the film 5 would have a thickness ranging from 1 to 2 mm.

Reproduction of such a silicone flat film 5 having a main surface 6 bearing a utility microstructure starting from a nickel master piece is disclosed in the article "Replication and compression of Bulk Surface Structures with Polydimethylsiloxane Elastomer", D. J. Campbell, K. J. Beckman, C. E. Calderon, P. W. Doolan, R. H. Moore, A. B. Ellis, G. C. Lisensky, J. Chem. Educ. Vol. 76, 537 (1999).

Figure 1E:
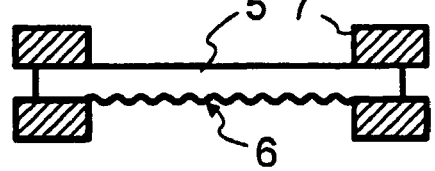

Once recovered, the flat elastomeric film 5 is placed in a mounting frame 7 which holds the film 5 at its periphery (FIG. 1E).

Figure 1F:
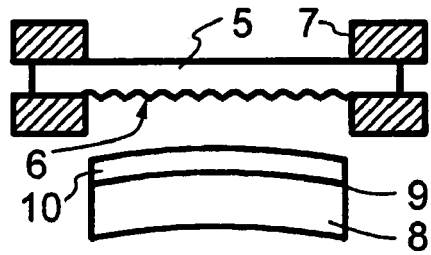
Figure 1G:
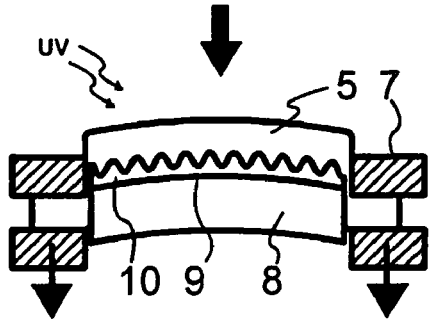

As shown in FIG. 1F, there is then provided a master article 8 such as an ophthalmic lens having at least one main curved surface 9. Preferably, master article 8 is an ophthalmic lens in particular an ophthalmic lens whose main curved surface is a spherical surface or a presbyopia correcting surface (i.e a progressive addition lens).

The master article 8 may be made of any material suitable for making ophthalmic lenses, but is preferably made of a plastic material, and in particular of diethyleneglycol bis-allylcarbonate copolymère (CR39® from PPG Industries) or polycarbonate (PC).

Other suitable materials for the master article 8 are glasses obtained by polymerization of allyl monomers derived from bisphenol A, such as those described in U.S. Pat. No. 4,959,429, polyalkyl(meth)acrylate in particular polymethyl(meth)acrylate, polystyrene resins and resins based on diallyl phtalate.

The preferred materials for the master article 8 are diethyleneglycol bis(allylcarbonate) polymers and copolymers and polycarbonate.

An appropriate amount of a curable composition 10 is then deposited on the main curved surface 9 of the master article 8. Alternatively, the curable composition 10 can be deposited on the main surface 6 bearing the replica of the utility microstructure 2 of the flat elastomeric film 5 or adequate amounts of the curable composition 10 may be deposited on both the main surface 6 of the flat film and the curved main surface 9 of the master article 8.

Preferably, the curable composition is a UV curable composition.

Any well known method can be used for depositing the curable composition, such as dip coating and spin coating.

If necessary, it is possible to apply the curable composition in two or more successive steps. For example, a first amount of curable composition is applied by dip or spin coating on either the surface 6 or 9 and then a larger amount is applied on the centre surfaces 6 and/or 9.

Thickness of the deposited curable composition 10 will typically range from 1 to 15 micrometers, preferably from 2 to 10 micrometers.

The curable coating composition 10 may be any curable coating composition used in the ophthalmic lens technology.

The curable coating composition can comprise urethanes, siloxanes or acrylic materials.

A preferred class of coating composition is coating composition comprising (meth)acrylic monomers or oligomers. The preferred monomers are di(meth)acrylate or tri(meth)acrylate monomers, in particular polyalkylene glycols di(meth)acrylates and/or poly(alkylenoxy)di(meth)acrylates. Particularly preferred compositions are those made of a mixture of butane diol diacrylate and pentaerythritoltriacrylate.

Other compositions that can be used, are for example those comprising hydrolysates of alkoxysilanes, in particular of organopolyalkoxysilanes, such as methyltrimethoxysilane, γ-glycidoxypropyltrimethoxysilane, and methacryloxypropyltrimethoxy silane. Examples of such compositions are disclosed in U.S. Pat. No. 4,211,823, WO 94/10230 and U.S. Pat. No. 5,015,523.

The main surface 6 bearing the replica of the utility microstructure 2 of the flat cured elastomeric film 5 and the main curved surface 9 of the master article 8 covered with the curable composition 10 are then placed in front of each other.

The cured elastomeric film 5 and the master article 8 are thereafter pressed against each other so as to conform the overall shape of the cured elastomeric film 5 to the curved shape of the main surface 9 of the master article 8 and to spread over the curable coating composition 10 between the curved main surface 9 of the master article 8 and the main surface 6 bearing the replica of said utility microstructure 2 of the cured elastomeric film 5.

Pressing can be done by either stretching the film across the curved main surface 9 of the master article 8 or by directly applying a pressure onto the surface of the flat elastomeric film 5 opposite to the main surface 6 bearing the replica of the utility microstructure 2 to press the flat elastomeric film 5 against the main curved surface 9 bearing the curable composition 9 of the master article 8. The curable composition 10 is then cured, preferably cured by photoactinic radiation, preferably UV radiation when the composition 10 is a photocurable composition.

Preferably, irradiation is made through the cured elastomeric film in order to reach the photocurable composition.

Figure 1H:
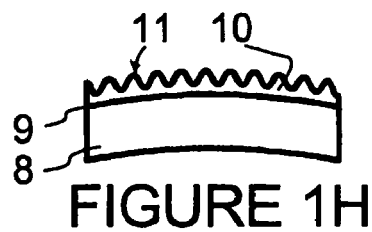
Figure 1I:
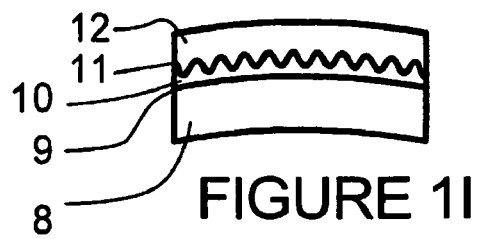
Figure 1J:
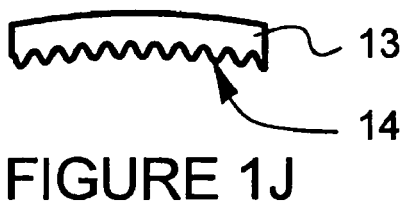

After disassembling and removing of the cured elastomeric film 5 there is recovered a hard coated master article 8 having its main curved surface 9 coated with a hard coating 10 having an exposed main surface 11 bearing a transferred utility microstructure as shown in FIG. 1H.

As shown in FIG. 1A, a metal or metallic alloy layer usually, nickel, is electrodeposited onto the exposed main surface 11 of the hard coat 10 of the master article 8.

Such an electrodeposition process is classical and is disclosed for example in European patent application 400.672.

After disassembling there is recovered a metal or metallic alloy mould piece 13, having a curved main surface 14 bearing a replica of the transferred utility microstructure which can be used for mass production of moulded articles bearing a utility microstructure, such as ophthalmic lenses.

Thickness of the metallic mould piece 13 typically will range from 0.3 mm to 5 mm.

Although the mould piece 13 may be attached to a reinforcing element, it is preferably of such a thickness so that it can be used directly without requiring any reinforcing element. In that case, a metallic mould piece has generally at least 1 mm thickness.

Figure 2:
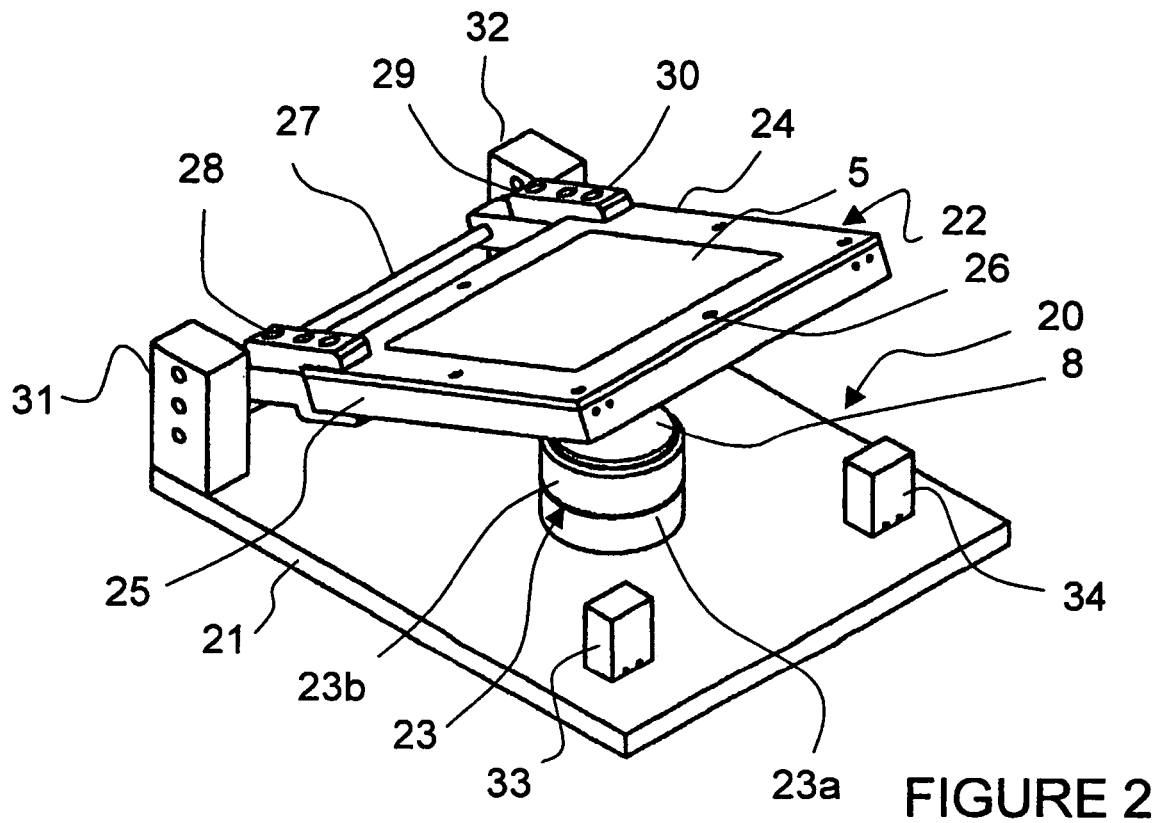
FIG. 2 is a perspective view of a jig specifically designed for pressing the cured elastomeric film and the master article (step g), the jig being in its open position prior to pressing.
Figure 3:
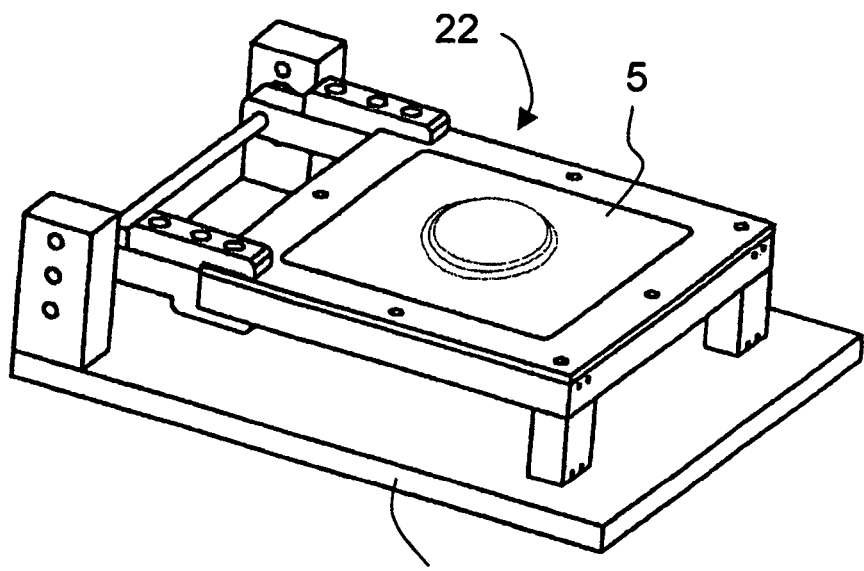
FIG. 3 is a perspective view of the jig of FIG. 2 in its closed position, i.e. at the end of the pressing step (step g)

There is represented in FIGS. 2 and 3 a specifically designed device or jig 20 for pressing a flat cured elastomeric film 5 bearing a replica of the utility microstructure.

Referring to FIG. 2, which is a perspective view of jig 20 in its open position, i.e. before implementing of the pressing step (step g) of the inventive process, jig 20 comprises a base plate 21 and a tiltable film holder 22 rotatably linked to the base plate 21. Base plate 21 comprises a support 23 for the master article 8, generally at its centre. Support 23 is preferably such that, when master article 8 is placed on support 23, only the main curved surface of master article 8 coated with the curable coating composition protrudes from support 23.

The film holder 22 comprises two separate complementary frames 24, 25 defining a central opening, which can be clamped together by appropriate means such as screws 26, so that the flat cured film 5 is placed between frames 24, 25 and firmly maintained flat in sandwich between the two separate complementary frames 24, 25 after assembling.

As previously indicated, film holder 22 is rotatably linked to base plate 21. For that purpose, complementary frames 24, 25 are rotatably linked to an axle 27 through connecting means 28, 29. As shown in FIG. 2, each connecting means 28, 29 comprise two separate parts that can be fixedly clamped to complementary frames 24, 25 through fixing means such as screws or bolts, thus allowing easy assembling and disassembling of the complementary frames 24, 25 and replacement of the film 5.

Each mounting means 28, 29 when assembled are rotatably linked with axle 27.

The ends of axle 27 are fixedly mounted within two upright posts 31, 32 protruding from the base plate 21 and spaced along one side thereof, and preferably at two contiguous corners thereof.

Preferably, at least one stop, such as posts 33, 34, is provided near the base plate side opposite to axle 27 in order to adequately limit rotation of the film holder 22 towards base plate 21.

As shown in FIG. 2, master piece support 23 comprises two separate parts. A first part 23a which is fixedly linked to or integrally made with base plate 21 and a second removable part 23b for accommodating the master piece 8.

The jig 20 operates as follows:

Film holder 22 is disassembled and the elastomeric film 5 is placed between the complementary frames 24, 25. Film holder 22 is reassembled and mounted on axle 27 with the microstructure bearing face of film 5 facing base plate 21. A coated master piece 8 is placed on support 23 with its coated curved face directed towards the film holder 22.

Then the film holder is rotated downwardly until it contacts stops 33, 34.

The film contacts first the master piece 8 at its centre and then the contact line moves outwards as the film holder 22 is lowered up to contacting steps 33, 34. Thereafter coating is cured.

After curing, the film holder 22 is lifted back to recover a master piece with a microstructure imprinted in its coated surface for further treatments.

Figure 4:
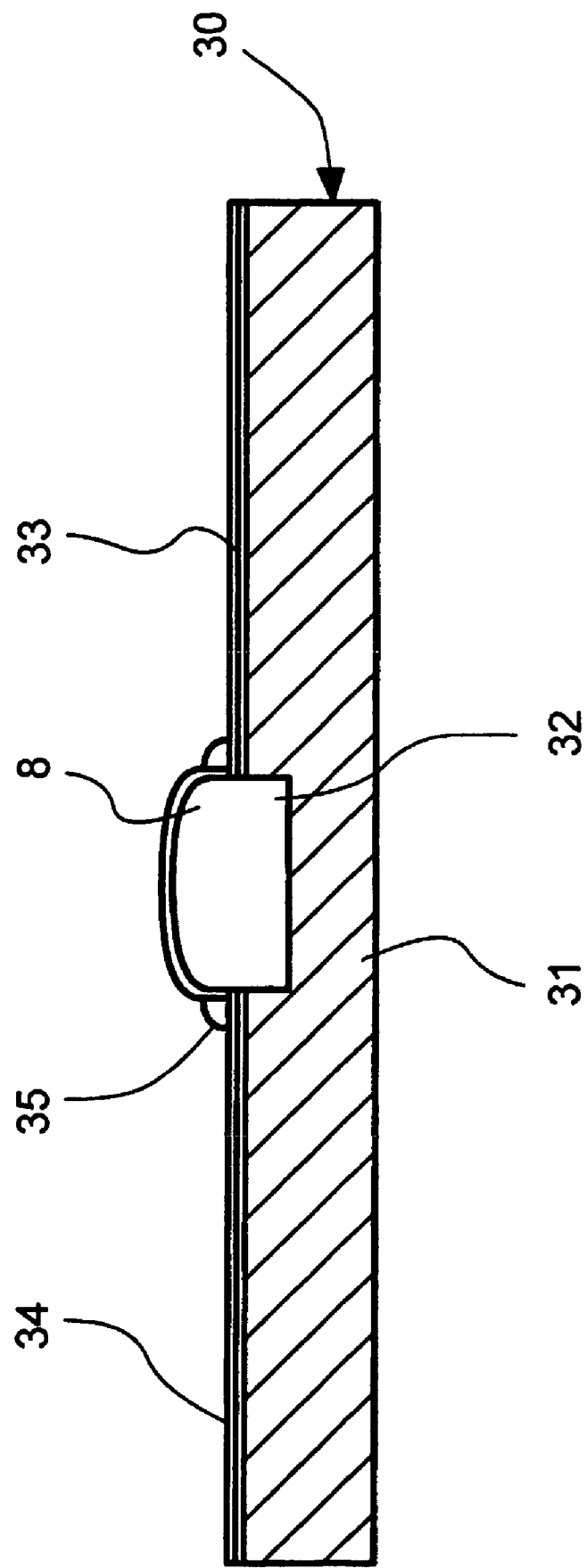
FIG. 4 is a schematic view of a jig for holding the lens during the electrodeposition process.

In FIG. 4, there is schematically shown a jig 30 for holding the master piece and particularly suitable for implementing the metal deposition step (step j) and in particular an electrodeposition step.

As shown in FIG. 4, jig 30 comprises a thick, flat, plastic plate 31 in which a recess 32 has been machined.

Recess 32 is machined so that master piece 8 having a curved surface bearing the microstructure is snuggly fitted in the recess 32 and only the microstructure bearing curved surface of the master piece 8 protrudes from recess 32.

Before the electrodeposition step, the plate is coated with a thin layer of a photoresist 33 to promote adhesion between the nickel and the plastic and an initial very thin metal layer 34 is formed on the master piece and the plate by sputtering or evaporation. The contact line between the master piece 8 and the plate 31 is then painted with a conductive adhesive 35 to improve the electrical contact.

EXAMPLE

A mould piece having a curved surface bearing an utility microstructure is made using the overall process described above.

1. Copying of the Microstructure

The flat master piece was a nickel flat master piece of 125×125 mm size and 1 mm thick comprising a surface relief grating with a period of 250 nm. This microstructure was initially obtained by holographic exposure of a photoresist.

The flat nickel master piece was then placed, with its imprinted microstructure facing up in a 150×150×30 mm metal container.

Then, a batch of a curable polydimethylsiloxane composition (Dow Corning Sylgard Elastomer 184 from Dow Corning) was prepared with a ratio of curing agent to base of 1:15. After mixing the components thoroughly, the mixture was set aside for 15 minutes to allow bubbles to rise out of the composition. Next, the composition was poured into the metal container to cover the master piece and set aside for 15 minutes to allow bubbles to rise out from the composition. Finally, the assembly was put in an oven at 130° C. for 20 minutes to cure the composition. After cooling down to room temperature, the cured composition was carefully removed from the nickel flat master piece in order to recover a cured elastomeric polydimethylsiloxane film having main surface bearing a replica of the microstructure. The cured PDMS film is totally transparent. The film has a thickness of several mm at this edge, whereas the portion thereof bearing the utilitary microstructure is 1-2 mm thick.

2. Transfer of Microstructure to Master Lens Hard Coat 0.5 ml of a commercially available UV curable composition (SHC-3100 Universal Coating from Gerber Coburn/LTI) are deposited on the convex surface of a CR39® lens having a negative power of −2.00 dioptries.

The silicone film was mounted in the film holder of the jig described in connection with FIGS. 2 and 3, with microstructure facing down, and film holder was lowered over the lens and clamped in position.

The silicone film contacted the centre of the lens first and then the contact line moved outwards as the sheet was lowered.

This excluded air bubbles from the interface. The height of the lens was chosen to ensure that the silicone film conformed exactly to the lens surface.

The UV curable composition was then cured by irradiation during 3 minutes with a UV light 130 mW/cm$^2$ intensity.

After separating the PDMS film from the lens, there was obtained a lens having a cured hard coat whose exposed surface bears a replica of the microstructure.

3. Obtention of a Nickel Mould Piece by Electroforming.

The master lens is mounted in a jig as disclosed in connection with FIG. 4. After deposition of a thin layer of a photoresist, an initial very thin layer of nickel is deposited by physical vapor deposition onto the exposed surface of the cured hard coat.

The contact line between the lens and the plastic plate is then painted with a conductive adhesive to improve the electrical contact.

The plastic plate is then mounted in a steel ring and the assembly placed in a classical electrodeposition device. The nickel coating was increased to 300 microns thickness by electrodeposition.

Thereafter, the master lens is withdrawn from the device and the nickel layer is separated from the master lens to recover a nickel mould piece having a main curved surface bearing a replica of the microstructure.

The invention claimed is:

1. A process for making a mold piece having a main curved surface bearing a microstructure comprising:
   (a) providing a master piece having a flat main surface bearing a microstructure;
   (b) transferring said microstructure from the master piece main surface to a main surface of a flat cured elastomeric film;
   (c) recovering the flat cured elastomeric film having a main surface bearing a replica of said microstructure;

(d) providing a master article having a main curved surface to be replicated;

(e) applying a curable coating composition either:
- on the main curved surface of the master article, or
- on the main surface bearing the replica of said microstructure of the flat cured elastomeric film, or
- on both main surfaces;

(f) placing the main surface bearing the replica of said microstructure of the flat cured elastomeric film and the main curved surface of the master article in front of each other;

(g) pressing said cured elastomeric film and said master article against each other so as to conform the overall shape of said cured elastomeric film to the curved shape of the main surface of the master article and to spread over the curable coating composition between the curved main surface of the master article and the main surface bearing the replica of the said microstructure of the cured elastomeric film;

(h) curing the coating composition;

(i) removing the cured elastomeric film and recovering a hard coated article having a main curved surface coated with a hard coating having an exposed main surface bearing a transferred microstructure;

(j) depositing a layer of a metal or a metallic alloy on said exposed main surface of the hard coating of the master article; and (k) recovering said metal or metallic alloy layer to obtain a mold piece having a curved main surface bearing a replica of said transferred microstructure.

2. The process of claim 1, wherein the master piece comprises a metal or metallic alloy piece.

3. The process of claim 2, wherein the metal is nickel.

4. The process of claim 1, wherein transfer step (b) is performed by pouring a liquid curable elastomeric composition over the main flat surface bearing the microstructure of the master piece and curing the composition.

5. The process of claim 4, wherein the elastomeric composition is cured by heat curing.

6. The process of claim 1, wherein the flat cured elastomeric film comprises a polysiloxane.

7. The process of claim 6, wherein the polysiloxane is a polydimethylsiloxane.

8. The process of claim 1, wherein the flat cured elastomeric film has a thickness ranging from 1 to 2 mm.

9. The process of claim 1, wherein the flat cured elastomeric film is held by a peripheral frame during pressing step (g).

10. The process of claim 1, wherein the curable coating composition comprises a monomer and/or oligomer of a (meth)acrylate compound.

11. The process of claim 1, wherein the curable coating composition is cured through UV irradiation.

12. The process of claim 1, wherein the microstructure is a hologram or a microstructure having antireflective properties.

13. The process of claim 1, wherein the microstructure is a periodically repetitive structure having a period of 250 nm.

14. The process of claim 1, wherein deposition step (j) comprises electrodepositing a metal or a metallic alloy.

15. The process of claim 1, wherein the mold piece is nickel.

16. The process of claim 1, wherein the master article is an ophthalmic lens the main surface of which is a spherical surface or a presbyopia correcting surface.

* * * * *

UNITED STATES PATENT AND TRADEMARK OFFICE
CERTIFICATE OF CORRECTION

PATENT NO. : 7,520,972 B2  
APPLICATION NO. : 10/519962  
DATED : April 21, 2009  
INVENTOR(S) : Gerhard Keller et al.

Page 1 of 1

It is certified that error appears in the above-identified patent and that said Letters Patent is hereby corrected as shown below:

In title page, item (75) Inventors, line 2, delete "Royston" and insert --Redhill-- therefor.

In title page, item (75) Inventors, line 4, delete "Chesterton" and insert --Cambridge-- therefor.

In title page, item (73) Assignee, line 1, delete "Essilor International" and insert --Essilor International (Compagnie Generale d'Optique)-- therefor.

Signed and Sealed this

Thirtieth Day of June, 2009

JOHN DOLL  
*Acting Director of the United States Patent and Trademark Office*